United States Patent [19]

Magee et al.

[11] Patent Number: 4,588,548
[45] Date of Patent: May 13, 1986

[54] PRESSURIZER PASSIVE STEAM RELIEF AND QUENCH SPRAY SYSTEM

[75] Inventors: Robert D. Magee, Monroeville; Michael J. Asztalos, Churchill; Vuong D. Trinh, Monroeville, all of Pa.

[73] Assignee: Westinghouse Electric Corp., Pittsburgh, Pa.

[21] Appl. No.: 622,317

[22] Filed: Jun. 19, 1984

[51] Int. Cl.$^4$ ................................................ G21C 1/08
[52] U.S. Cl. ..................................................... 376/307
[58] Field of Search ...................... 137/87; 165/104.32; 376/307, 283

[56] References Cited

U.S. PATENT DOCUMENTS

| | | | |
|---|---|---|---|
| 3,060,110 | 10/1962 | Wainrib | 376/307 |
| 3,448,797 | 6/1969 | Chevallier et al. | |
| 3,523,521 | 8/1970 | Goodwin | 137/87 |
| 3,877,478 | 4/1975 | Longworth | |
| 4,051,892 | 10/1977 | Reinsch | |

FOREIGN PATENT DOCUMENTS

| | | |
|---|---|---|
| 1045625 | 12/1958 | Fed. Rep. of Germany |
| 3003991 | 9/1980 | Fed. Rep. of Germany |
| 732670 | 9/1932 | France |
| 796164 | 6/1958 | United Kingdom |
| 1599879 | 10/1981 | United Kingdom |

OTHER PUBLICATIONS

R. E. Wascher et al., "Swing Check Valves have New Application", *Power*, (Apr. 19, 1970), two pages.
Olivon et al., Nuclear Engineering International, May 1984, pp. 40–43.

*Primary Examiner*—Deborah L. Kyle
*Assistant Examiner*—Richard W. Wendtland
*Attorney, Agent, or Firm*—Daniel C. Abeles

[57] ABSTRACT

Apparatus for reducing the pressure in a pressurizer of a pressurized water type cooling system for a nuclear reactor when a predetermined pressure value is reached including a closed tank which is provided with coolant fluid outlet and inlet pipes or conduits which extend respectively from the bottom and top of the tank, and which are connectable, via a normally closed self-actuated mechanical pressure relief valve, to a spray nozzle in the upper end of the pressurizer and to the vapor space within the upper portion of the pressurizer respectively. The tank is disposed vertically above the pressurizer and is partially filled with liquid coolant which is subcooled for the pressure existing in the pressurizer, while the four-way valve is set to open in response to the predetermined pressure being reached in the pressurizer. The opening of the valve causes liquid coolant from the tank to be sprayed into the vapor space in the upper portion of the pressurizer to quench the vapor, and the vapor in the vapor space to expand into the available volume at the top of the tank, whereby the pressure in the pressurizer is reduced.

10 Claims, 3 Drawing Figures

PRESSURIZER PASSIVE STEAM RELIEF AND QUENCH SPRAY SYSTEM

BACKGROUND OF INVENTION

The present invention relates to a pressurizer, and in particular a pressurizer for the primary coolant system of a nuclear reactor of the pressurized water type. More specifically, the present invention relates to a passive system for providing both a pressure release and a quenching spray of liquid coolant in the pressurizer to suppress the pressure when it reaches a predetermined value.

In a nuclear reactor of the pressurized water type, the primary coolant system generally includes a plurality of primary coolant circulation loops, each containing a steam generator and a coolant pump, which are connected to the reactor vessel wherein they are interconnected. To suppress boiling of the primary coolant, which is generally water, a pressurizer is connected to the primary coolant system so as to maintain a desired pressure or pressure range within the primary coolant system. This pressurizer, which is a closed vertical vessel having a coolant connection between its lower end and the hot leg of one circulation loop of the reactor coolant system, is provided with heaters in its lower end for heating the coolant within the pressurizer sufficiently to convert the coolant to a vapor or gas which is trapped in the upper portion of the pressurizer vessel so as to maintain a pressure of for example 150 atm in the primary coolant system. The vapor space in the top of the pressurizer also provides an additional volume for expansion of the liquid coolant upon an increase in its temperature, for example as a result of a decrease in load.

To limit the maximum pressure in the pressurizer, and thus in the reactor coolant system, and/or to reduce the pressure when necessary, a number of devices are conventionally used in the upper end of the pressurizer. Initially, the upper end of the pressurizer vessel is provided with at least one spring loaded safety valve, which is responsive to the pressure in the upper end of the pressurizer reaching a predetermined maximum safe value, which vents the gaseous coolant, e.g. steam, in the upper end of the pressure vessel to a pressurizer relief tank wherein it is condensed and cooled by mixing with liquid coolant that is near ambient temperature. Moreover, to permit relief of the pressure in the upper end of the pressurizer vessel before it reaches the maximum pressure to which the safety valves are set, and thus limit any pressure excursions occurring during normal operation, one or more power operated relief valves are connected between the upper end of the pressurizer vessel and the pressurizer relief tank. These power operated pressure relief valves are controlled by means of a pressure sensor which senses the pressure in the upper end of the pressurizer, and opens the pressure relief valves at a pressure slightly lower than the pressure to which the safety valves are set. For example, with the safety valves set at 2485 psig, the power operated relief valves could be set to 2335 psig.

Finally, in order to control and/or suppress the pressure in the pressurizer vessel, the upper end of the pressurizer is provided with a spray nozzle which is connected via controllable valves to the cold leg of one or more of the circulation loops of the primary coolant system so as to spray liquid coolant onto the steam and condense same. The rate of spray is selected such that following a step load reduction in power of a given small percent of full load, the pressure in the pressurizer will not reach the operating or set point of the power operated relief valves.

Although the above described system operates satisfactorily, problems do occur, particularly with regard to the power driven relief valves. Such valves intially have a tendency to leak, thus resulting in the need for further safety measures in these lines as well as increased maintenance costs. Additionally, the opening of such valves results in a quantity of the primary coolant leaving the otherwise closed primary coolant system, and this released quantity of coolant must later be resupplied to the primary coolant system. However, since these relief valves vent the pressure to a pressurizer relief tank, which also receives liquids from other relief valves in the reactor system, the cooling fluid in the pressurizer relief tank must be reprocessed before it can be returned to the primary coolant system, and this processing step is clearly undesirable.

SUMMARY OF THE INVENTION

It is therefore the primary object of the present invention to avoid the above problems of the known power operated relief valves by providing a pressurizer pressure relief system which does not require any power operated pressure relief valves, and does not require any reprocessing of the vaporized coolant released from the pressurizer as a result of a pressure suppression or relief.

The above object is basically achieved according to the present invention in that in a pressurized water type cooling system for a nuclear reactor including: a reactor pressure vessel; a plurality of primary liquid coolant circulation loops for the reactor pressure vessel with the loops being in communication within the reactor pressure vessel to form a closed primary reactor cooling system, and with each loop including a hot leg and cold leg leading respectively from and to the reactor pressure vessel, a steam generator having its input connected to the respective hot leg and its output connected to the respective cold leg, and a coolant pump connected in the respective cold leg; a vertical pressurizer vessel which is partially filled with liquid coolant; a coolant connection from the lower end of the pressurizer vessel to the hot leg of one of the loops; a heater for heating the coolant in the lower end of the pressurizer vessel so as to produce a pressure in the upper end of said pressurizer vessel, and hence in the primary cooling system, such that the coolant in the primary cooling system does not boil; and means, connected to the upper end of said pressurizer vessel, for reducing the pressure in the pressurizer vessel; the means for reducing the pressure in said pressurizer vessel comprises: a coolant spray nozzle in the upper end of said pressurizer vessel; a closed coolant tank disposed vertically above the pressurizer vessel and containing liquid coolant which is subcooled at the pressure within said primary cooling system; a pressure outlet in the upper end of the pressurizer vessel; first and second coolant connections for the coolant tank, with the first coolant connection being at the bottom of the tank and the second coolant connection being near the top of the tank; and a pressure responsive valve means, which is responsive to the pressure in the pressurizer vessel reaching a predetermined value, for connecting the first and second coolant connections to the nozzle and to the pressure outlet, respectively.

According to the preferred embodiment of the invention, the pressure responsive valve means is a four way normally closed spring actuated pressure relief valve which is opened when the pressure in the pressurizer reaches the predeteremined value so as to connect the bottom of the tank to the spray nozzle in the pressurizer vessel, and to connect the top of the pressurizer to the top of the tank. Thus, the present invention provides a closed self-contained pressure relief arrangement which simultaneously provides subcooled liquid coolant to the spray nozzle of the pressurizer so as to quench or condense the vapor in the upper portion of the pressurizer vessel and thus reduce the pressure, while simultaneously providing pressure relief in that an expansion volume for the vapor in the upper portion of the pressurizer is provided, i.e. the volume in the top of the tank.

Although the arrangement according to the invention is generally intended to replace the power driven pressure relief valve or valves normally found in a cooling system for a nuclear reactor of the pressurized water type, it should be noted that the system according to the invention for reducing pressure may be utilized in addition to the power driven pressure relief valves. In such case, the predeteremined pressure at which the arrangement according to the invention operates would be lower than that to which the power driven pressure relief valves are set.

DETAILED DESCRIPTION OF THE PREFERRED EMBODIMENTS

Figure 1:
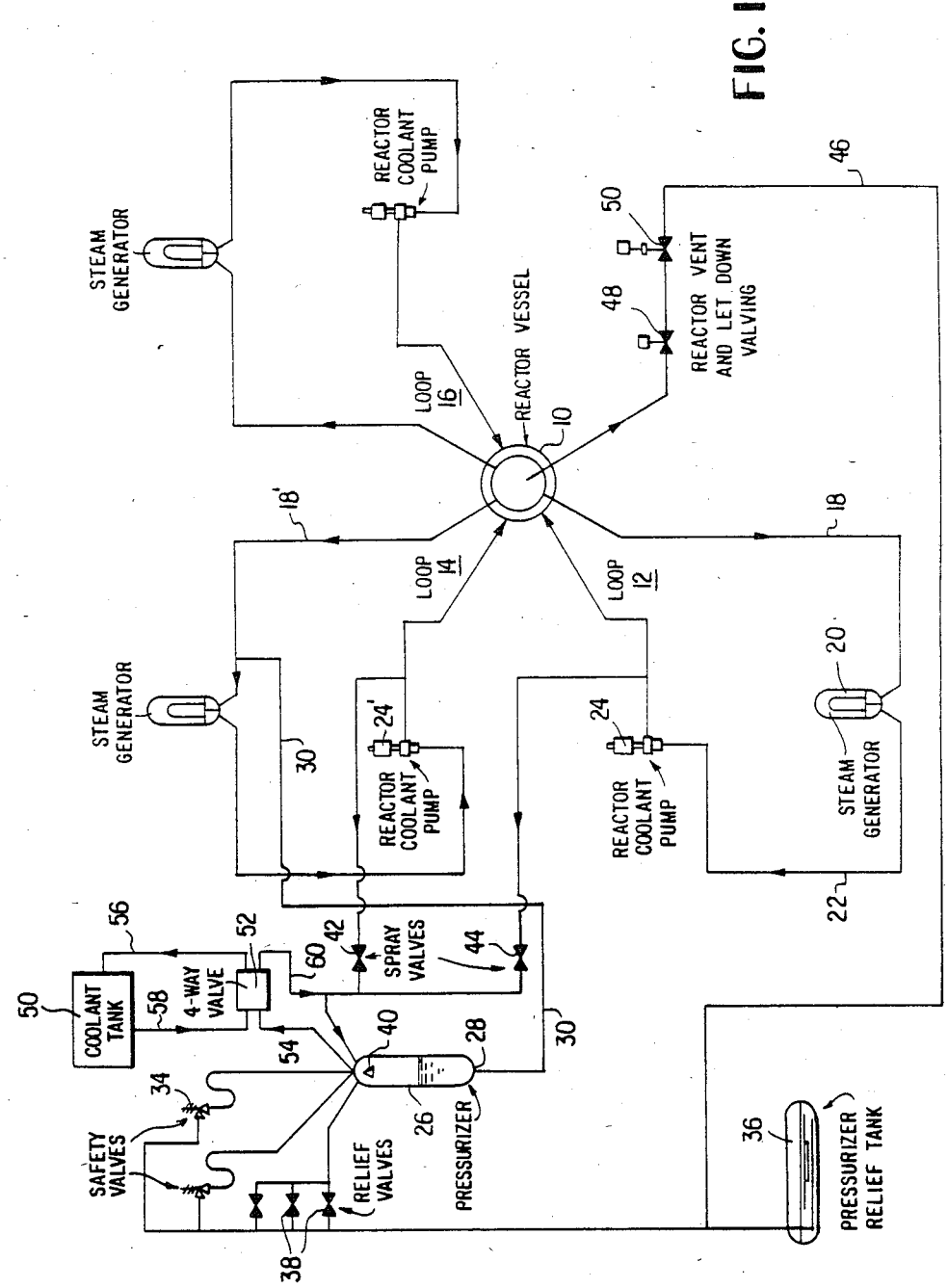
FIG. 1 is a schematic flow diagram showing a conventinal three loop coolant system for a nuclear reactor of the pressurized water type which has been modified according to the invention.

Referring now to FIG. 1, there is shown a primary reactor cooling system for a nuclear reactor for the pressurized water type including a reactor vessel 10 to which, in a conventional manner, three primary coolant circulation loops 12, 14 and 16 are connected so as to form a closed primary coolant circulation system. As shown, each circulation loop, for example the loop 12, contains a conduit or hot leg 18 leading from the reactor vessel 10 to the input of a steam generator 20, and a further conduit or cold leg 22 leading from the output of the steam generator 20 back to the reactor vessel 10 via a reactor coolant pump 24. The remaining circulation loops 14 and 16 are each similarly constructed.

Figure 2:
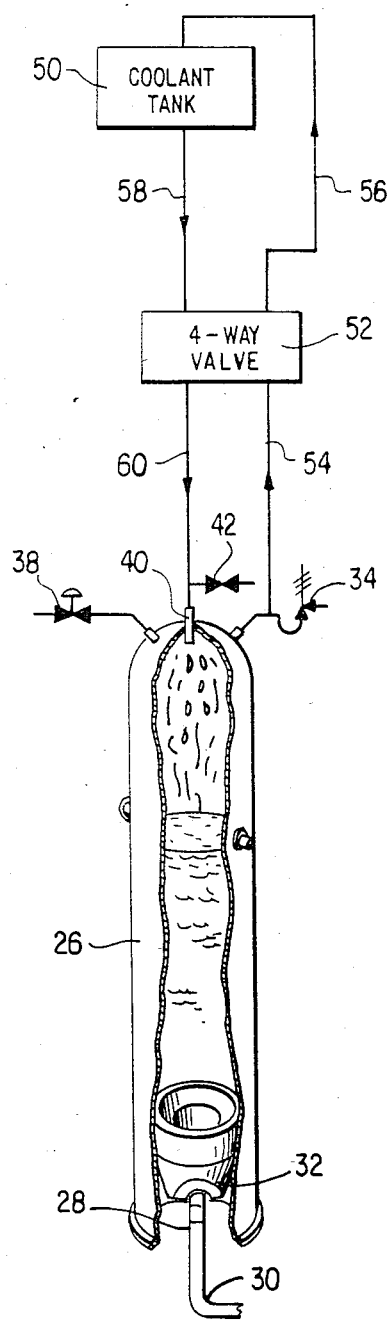
FIG. 2 is a schematic illustration, partially cut away, showing a pressurizer with its modified connections according to the invention in greater detail.

In order to maintain the coolant within the primary coolant circulation system at a pressure such that it does not boil, while at the same time providing an expansion volume for the coolant resulting, for example, from an increase in the temperature of the coolant flowing in the primary system as a result of a decrease in load, a pressurizer 26 is provided. The pressurizer 26, which is shown in greater detail in FIG. 2, is a vertical cylindrical vessel which is closed at its top and bottom to define a chamber whose bottom portion is partially filled with liquid coolant, i.e. water, and whose upper portion contains vaporized coolant, i.e. steam, during operating conditions. The bottom of the pressurizer vessel 26 is provided with an opening 28 which is connected via a conduit 30 to the hot leg to one of the loops 12, 14 and 16, i.e., the hot leg 18' of the loop 14 as shown. Disposed within the pressurizer vessel 26 adjacent its lower end, is at least one heater 32 for heating the liquid coolant within the pressurizer vessel 26 sufficiently to cause the generation of vapor or steam which is collected in the upper portion of the vessel 26 to produce the desired pressure in the primary cooling system. That is, the pressure in the system is increased by simply using the heaters 32 to sufficiently heat the water in the pressure vessel 26 until the desired pressure is reached.

In order to maintain the pressure in the pressurizer, and thus in the system, below certain maximum pressures for safety reasons, a number of complimentary pressure reducing arrangements are generally provided. Initially, in order to prevent the pressure in the system from exceeding a maximum pressure as determined by the system design, one or more safety valves 34, which are self actuated spring loaded pressure relief valves of conventional design for this purpose, are connected via conduits between the upper end of the pressurizer vessel 26 and a pressurizer relief tank 36 wherein the released vaporized coolant, i.e. steam, is condensed. Moreover, to limit pressure excursions occurring in the pressurizer 26 during normal operation, and thus limit the the frequency of operation of the safety valves 34, a plurality of parallely connected pressure relief valves 38 are likewise connected, via suitable conduits, between the upper end of the pressurizer vessel 26 and the pressurizer relief tank 36. These pressure relief valves 38 are, as indicated above, conventional power driven valves which are responsive to signals provided by sensing elements (not shown) in the pressurizer vessel 26 and which are controlled or set to open at a pressure less than that to which the safety valves 34 are set.

Since, as indicated above, the reduction of pressure in the pressurizer 26 by venting the steam to the pressurizer relief tank 36 via pressure relief valves is undesirable, the pressure in the pressurizer 26 can additionally be reduced by supplying a spray of cooled liquid coolant to the upper end of the pressurizer vessel 26 to quench or condense the steam, and thus lower the pressure. For this purpose, a spray nozzle 40 is provided in the upper end of the pressurizer vessel 26 and is connected, via respective valves 42 and 44 to the portion of the respective cold leg of two of the coolant circulation loops (loops 12 and 14 as shown) which is disposed between the respective reactor coolant pump 24 and the reactor vessel 10. The valves 42 and 44 are likewise controlled by sensors (not shown) associated with the pressurizer 26 so as to maintain a spray rate in the pressurizer 26 which is selected to prevent the pressure in the pressurizer from reaching the operation or set point of the relief valves 36 following a given step load reduction in power.

Finally, as also shown in FIG. 1, the pressure in the reactor vessel 10 may also be vented to the pressurizer relief tank 36, when necessary, by means of conduit 46 containing motor or power driven valves 48 and 50.

It should be noted that the pressurized water reactor type coolant system thus far described is known in the art. Moreover, although the system has been illustrated with three circulation loops, it is to be understood that the system may contain more or less circulation loops without requiring any change in the manner in which the pressurizer 36 with its various pressure control arrangements is connected to the loops.

Since, as indicated above, the relief valves 38 tend to leak and, moreover, undesirably release coolant from the system to the pressurizer relief tank 36 when opened, according to the invention the relief valves 38 are either eliminated completely or the frequency of their use substantially reduced, by providing a selfcontained pressure relief system for the pressurizer 26 which essentially consists of a closed tank 50, at least partially filled with liquid coolant, i.e. water, which is subcooled at the pressure existing in the pressurizer vessel 26, and separate inlet and outlet piping for the tank 50 which lead to the vapor space in the upper end of the pressurizer vessel 26 via a normally closed four-way valve 52. More specifically, the four-way valve 52 is connected by a first steam conduit 54 to the vapor space wherein the upper end of the pressurizer vessel 26, by means of a second steam conduit 56 to the upper end of the tank 50, by means of a water conduit 58 to the bottom of the tank 50, and by means of a further water conduit 60 to the spray nozzle 40 of the pressurizer vessel 26. The four way valve 52, is a spring actuated single acting relief valve which is normally closed so that no flow normally exists through any of the conduits 54, 56, 58 and 60.

The spring pressure of the four way valve 52 is set so that the valve opens at a predetermined pressure in the vapor space of the pressurizer vessel 26, and in so doing provides a continuous flow path between the steam conduits 54 and 56 and between the water conduits 58 and 60. Consequently, upon opening of the four way valve 50, subcooled water will be discharged from the bottom of the tank 50, which is disposed vertically above the pressurizer vessel 26, into the pressurizer vessel 26 via the spray nozzle 40, and steam will be discharged from the vapor space of the pressurizer vessel 26 to the top of the tank 50. The force pushing the subcooled water from the tank 50 into the pressurizer vessel 26 will thus be the density difference between the liquid and the steam.

As can be appreciated, the system according to the invention effectively reduces the pressure in the pressurizer 26 by providing an additional volume in the top of the tank 50 for expansion of the high pressure steam in the pressurizer vessel 26 and by causing the discharge of subcooled water from the tank 50 into the pressurizer 26 so as to additionally suppress the pressure by condensing the steam in the pressurizer 26. Thus, the system according to the invention provides, in a very simple manner, a completely contained pressure relief system for the pressurizer 26 which will not require any reprocessing of the steam released from the pressurizer 26 in order to reduce the pressure, nor any valves of the type which tend to leak.

As indicated above, the tank 50 must be situated above the pressurizer vessel 26, as shown, for proper operation of the system. However, the height of the tank 50 above the pressurizer vessel 26 is not critical and moreover is variable and will determine how fast the water will flow from the tank 50 into the pressurizer 26. Moreover, while the water in the tank 50 must be subcooled at the pressure existing in the pressurizer vessel 26, generally no actual cooling of the water in the tank 50 is required, i.e. the water in the tank 50 may be at ambient temperature. However, it may be necessary, under certain circumstances, to at least cool the water in the tank 50 following a discharge to the tank 50, and accordingly the tank 50 may be provided with a conventional cooling arrangement (not shown).

Figure 3:
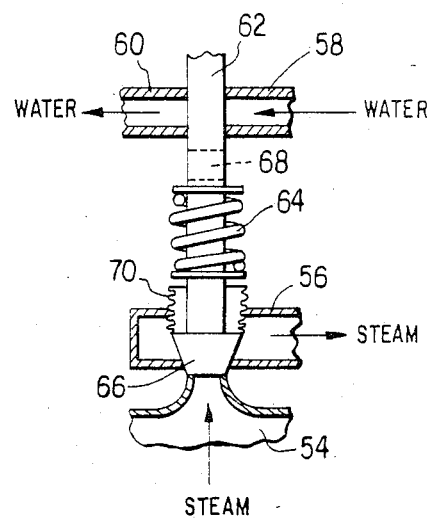
FIG. 3 is a schematic sectional view of a mechanical four-way pressure relief valve which may be used in an arrangement according to the invention.

Turning now to FIG. 3, there is shown a schematic illustration of a four way valve 52 which is usable in the arrangement according to the invention. As shown, the valve essentially contains a plunger 62 which, in a manner conventional in the art for such mechanical self-actuated pressure relief valves, is movable relative to the various conduits 54, 56, 58 and 60 and is urged by a spring 64 in the direction of the high pressure conduit 54 so that its enlarged lower end 66 blocks or seals the end of the conduit 54. The opposite end of the plunger 62 extends between the two water conduits 58 and 60 so as block same when the plunger 62 is in the illustrated position, i.e. being urged by spring 64 so as to seal the end of conduit 54. The plunger 62 is additionally provided with a through passage 68 which is disposed so that it will align itself with the conduits 58 and 60 when the plunger 62 is raised or moved due to the pressure in the conduit 54 exceding the set point of the valve 52 as determined by the spring 64. Consequently, when the plunger 62 is moved from the illustrated normally closed position to the open position due to the pressure in the conduit 54, a steam flow path will be provided between the conduit 54 and the conduit 56, and a water flow path will be established between the conduit 58 and the conduit 60 via the passage 68. In a manner which is conventional in this art, the relief valve 52, is likewise provided with a bellows arrangement 70 which is disposed around the plunger 62 between the spring 64 and the enlarged end 66, and which serves to mitigate the effect of the back pressure in the tank 50.

Although the pressure reducing arrangement according to the invention is primarily intended to replace the power operated pressure relief valves, the arrangement according to the invention can, in principle, be utilized additionally to replace the spray cooling function provided via valves 42 and 44 from the circulation loops during overpressure transients.

Moreover, although the pressure reducing arrangement according to the invention is primarily intended for use with a pressurizer in a pressurized water cooling system for a nuclear reactor, the arrangement may likewise be used with coolants other than water and/or with a pressurizer in a conventional heating or cooling system of the pressurized water type.

It will be understood that the above description of the present invention is susceptible to various modifications, changes and adaptations, and the same are intended to be comprehended within the meaning and range of equivalents of the appended claims.

We claim:

1. In a cooling system of the pressurized water type for a nuclear reactor including: a reactor pressure vessel; a plurality of primary liquid coolant circulation loops for said reactor pressure vessel with said loops being in communication within said reactor pressure vessel to form a closed primary reactor cooling system, and with each said loop including a hot leg and a cold leg leading respectively from and to said reactor pressure vessel, a steam generator having its input connected to the respective said hot leg and its output connected to the respective said cold leg, and a coolant pump connected in the respective said cold leg; a vertical pressurizer vessel which is partially filled with liquid coolant; a coolant connection from the lower end of said pressurizer vessel to said hot leg of one of said loops; a heater for heating the liquid coolant in the lower portion of said pressurizer vessel so as to produce a pressure in the upper portion of said pressurizer vessel, and hence in said primary cooling system, such that the coolant in said system does not boil; and means, connected to the upper end of said pressurizer vessel, for reducing the pressure in said pressure vessel; the improvement wherein said means for reducing the pressure in said pressurizer vessel comprises: a coolant spray nozzle in the upper end of said pressurizer vessel; a closed coolant tank disposed vertically above said pressurizer vessel and containing liquid coolant which is subcooled at the pressure within said primary cooling system; a pressure outlet in the upper end of said pressurizer vessel; first and second coolant connections for said coolant tank, with said first coolant connection being at the bottom of said tank and said second coolant connection being near the top of said tank; and pressure responsive valve means, responsive to the pressure in said pressurizer vessel reaching a predetermined value, for connecting said first and second coolant connections to said nozzle and to said pressure outlet, respectively.

2. Apparatus as defined in claim 1 wherein said coolant tank is partially full of said liquid coolant and said second coolant connection is above the liquid coolant level in said tank.

3. Apparatus as defined in claim 1 wherein said pressure responsive valve means includes: a four way normally closed mechanical pressure relief valve.

4. Apparatus as defined in claim 3 wherein said pressure relief valve includes first and second fluid flow paths with said first flow path being connected between said first coolant connection of said tank and said spray nozzle, and said second flow path being connected between said second coolant connection of said tank and said pressure outlet of said pressurizer vessel, a movable plunger extending through said first flow path to block said first flow path when in a first position and having a passage therethrough to complete said first flow path when in a second position, said plunger having a plug at one end which interrupts said second flow path when in said first position and for opening said second flow path when in said second position; and mechanical spring means for normally urging said plunger into said first position to block the flow of coolant from said pressure outlet whereby said plunger is moved to said second position when the pressure in said pressurizer vessel reaches said predetermined value.

5. Apparatus as defined in claim 1 wherein said means for reducing the pressure in said pressurizer vessel further comprises: a further coolant connection between said nozzle and the portion of the cold leg of at least one of said loops which is disposed between said reactor pressure vessel and the respective said coolant pump; and a controllable valve disposed in each said further coolant connection, whereby said controllable valve may be used to control the pressure in said pressurizer vessel at pressures below said predetermined value.

6. Apparatus as defined in claim 5 wherein said means for reducing the pressure in said pressurizer vessel further comprises: at least one self actuated pressure safety valve connected between a pressure outlet at the upper end of said pressurizer vessel and a pressurizer relief tank, said pressure safety valve opening at a pressure greater than said predetermined pressure value to release vaporized coolant under pressure in the upper end of said pressurizer vessel to said pressurizer relief tank.

7. Apparatus as defined in claim 6 wherein said means for reducing the pressure in said pressurizer vessel further comprises: at least one controllable pressure relief valve connected between a further pressure outlet at the top of said pressurizer vessel and said pressurizer relief tank.

8. Apparatus as defined in claim 1 wherein said means for reducing the pressure in said pressurizer vessel further comprises: at least one self actuated pressure safety valve connected between a pressure outlet at the upper end of said pressurizer vessel and a pressurizer relief tank, said pressure safety valve opening at a pressure greater than said predetermined pressure value to release vaporized coolant under pressure in the upper end of said pressurizer vessel to said pressurizer relief tank.

9. Apparatus as defined in claim 1 wherein said liquid coolant is water.

10. A pressurizer arrangement comprising in combination: a closed pressurizer vessel having a lower portion for containing water and an upper portion for containing steam; an opening in the bottom of said vessel for connecting said vessel to the primary water circuit of a heating or cooling installation; a heater in said lower portion of said vessel for heating the water in said vessel to produce steam; a water spray nozzle in the upper portion of said vessel; a closed water tank, partially filled with water, disposed vertically above said pressurizer vessel; and a normally closed four-way mechanical pressure relief valve means, which is responsive to the pressure in said vessel, and opens when reaching a predetermined value, for connecting the lower portion of said tank to said spray nozzle and the upper portion of said tank to the upper portion of said pressurizer vessel when said pressure in said vessel reaches a predetermined value, whereby the pressure in said vessel is reduced by water being sprayed into the upper end of said vessel via said nozzle to quench the steam, in said vessel and steam in said vessel expanding into said tank.

* * * * *